United States Patent
Aluru et al.

(10) Patent No.: US 12,540,833 B2
(45) Date of Patent: Feb. 3, 2026

(54) TUNNEL DETECTION SYSTEM

(71) Applicant: GM Global Technology Operations LLC, Detroit, MI (US)

(72) Inventors: Sai Vishnu Aluru, Commerce Township, MI (US); Siva Chinthalapudi, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 89 days.

(21) Appl. No.: 18/414,319

(22) Filed: Jan. 16, 2024

(65) Prior Publication Data
US 2025/0231048 A1 Jul. 17, 2025

(51) Int. Cl.
*G06F 3/048* (2013.01)
*G01C 21/00* (2006.01)
*G06V 20/56* (2022.01)

(52) U.S. Cl.
CPC ..... *G01C 21/3893* (2020.08); *G01C 21/3807* (2020.08); *G01C 21/3841* (2020.08); *G06V 20/588* (2022.01)

(58) Field of Classification Search
CPC ............ G01C 21/3893; G01C 21/3841; G01C 21/3807; G06V 20/588
See application file for complete search history.

(56) References Cited

U.S. PATENT DOCUMENTS

| | | | |
|---|---|---|---|
| 8,965,687 B2* | 2/2015 | Matsuo | G01C 21/30 701/431 |
| 9,651,390 B1* | 5/2017 | Thompson | G01C 21/367 |
| 9,734,425 B2* | 8/2017 | Zhong | B60S 1/0844 |
| 9,892,330 B2* | 2/2018 | Jung | G06V 20/56 |
| 10,597,002 B1* | 3/2020 | Baldovino | B60H 1/00735 |
| 2008/0044062 A1* | 2/2008 | Stam | G06V 10/141 382/104 |
| 2018/0024565 A1* | 1/2018 | Fridman | G01C 21/3848 701/26 |
| 2019/0019330 A1* | 1/2019 | Miyaoka | G01C 21/3841 |
| 2022/0051032 A1* | 2/2022 | Yan | G06V 20/588 |
| 2022/0269900 A1* | 8/2022 | Hölzel | G06V 10/273 |
| 2023/0360178 A1* | 11/2023 | Hung | G06V 20/588 |
| 2024/0233393 A1* | 7/2024 | Tairbekov | G06V 20/588 |
| 2024/0420418 A1* | 12/2024 | Wu | G06F 40/30 |
| 2025/0033673 A1* | 1/2025 | Stumpf | B60W 60/005 |

* cited by examiner

*Primary Examiner* — David Phantana-angkool
(74) *Attorney, Agent, or Firm* — Honigman LLP; Matthew H. Szalach; Jonathan P. O'Brien

(57) ABSTRACT

A tunnel detection system includes an imager configured to capture image data and including a microcontroller, radar configured to capture radar data, and an ambient light sensor configured to capture light data. An electronic control unit (ECU) is communicatively coupled with each of the imager, the radar, and the ambient light sensor. The ECU includes data processing hardware that includes a tunnel detection application and a navigation application. The tunnel detection application is configured to compare an exposure value of the image data and a light value of the light data with the radar data to define tunnel data. The tunnel detection application is further configured to identify a tunnel based on the tunnel data.

20 Claims, 8 Drawing Sheets

TUNNEL DETECTION SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a tunnel detection system.

Vehicles typically utilize radar detection to monitor the environmental surroundings. For example, vehicle systems may evaluate data received from radar detection to determine changes along a roadway, such as a tunnel. However, radar detection data demonstrates an incorrect and imprecise approach to finding tunnels. Further, radar detection data demonstrates a high number of false detections and target misses within tunnels. Thus, there is a need for improved systems for detecting tunnels and monitoring vehicles during travel through tunnels.

SUMMARY

In some aspects, a computer-implemented method when executed by data processing hardware causes the data processing hardware to perform operations. The operations include detecting radar data via a radar, receiving image data from an imager and light data from an ambient light sensor, and setting a tunnel detection flag based on at least one of the radar data and the image data. The operations also include receiving, from a navigation database of a server, tunnel locations based on location data from the server, comparing the image data and the light data with the radar data and the tunnel locations to define tunnel data, and activating the tunnel detection flag in response to the tunnel data.

In some examples, comparing the image data and the light data with the radar data and the tunnel locations may include identifying a tunnel. Optionally, the operations may include fusing the tunnel data, communicating the fused tunnel data to the server, updating, on the server, a vehicle database with the fused tunnel data, and communicating the fused tunnel data with one or more third-party vehicles. In some implementations, setting the tunnel detection flag may include executing at least one of a histogram enhancement and gradient slicing of the image data. The operations may also include calibrating, at an electronic control unit, a differential threshold of a tunnel detection application. In some examples, executing at least one of the histogram enhancement and the gradient slicing may include determining an exposure differential of the image data and comparing the exposure differential to the differential threshold. Optionally, comparing the light data with the radar data may include determining a radar confirmation status and a light confirmation status and comparing the radar confirmation status with the light confirmation status.

In other aspects, a tunnel detection system includes data processing hardware and memory hardware in communication with the data processing hardware. The memory hardware stores instructions that when executed on the data processing hardware cause the data processing hardware to perform operations. The operations include detecting radar data via a radar, receiving image data from an imager and light data from an ambient light sensor, and setting a tunnel detection flag based on at least one of the radar data and the image data. The operations also include receiving, from a navigation database of a server, a tunnel location based on location data from the server, comparing the image data and the light data with the radar data and the tunnel location to define tunnel data, and activating the tunnel detection flag in response to the tunnel data.

In some examples, comparing the image data and the light data with the radar data and the tunnel location may include identifying a tunnel. The operations may also include fusing the tunnel data, communicating the fused tunnel data to the server, updating, on the server, a vehicle database with the fused tunnel data, and communicating the fused tunnel data with one or more third-party vehicles. Optionally, setting the tunnel detection flag may include executing at least one of a histogram enhancement and gradient slicing of the image data. The operations may include calibrating, at an electronic control unit, a differential threshold of a tunnel detection application. In some implementations, executing at least one of the histogram enhancement and the gradient slicing may include determining an exposure differential of the image data and comparing the exposure differential to the differential threshold. In some examples, comparing the light data with the radar data may include determining a radar confirmation status and a light confirmation status and comparing the radar confirmation status with the light confirmation status.

In further aspects, a tunnel detection system includes an imager configured to capture image data and including a microcontroller, radar configured to capture radar data, and an ambient light sensor configured to capture light data. An electronic control unit (ECU) is communicatively coupled with each of the imager, the radar, and the ambient light sensor. The ECU includes data processing hardware that includes a tunnel detection application and a navigation application. The tunnel detection application is configured to compare an exposure value of the image data and a light value of the light data with the radar data to define tunnel data. The tunnel detection application is further configured to identify a tunnel based on the tunnel data.

In some examples, the microcontroller of the imager may be configured to execute at least one of a histogram enhancement and gradient slicing of the image data to define the exposure value. Optionally, the tunnel detection application may include differential values including an exposure differential and a light differential. The tunnel detection application may be configured to compare the differential values with a differential threshold of the tunnel detection application. In some implementations, the tunnel detection application may be configured to execute radar fusion with the light data and the radar data using a radar confirmation status and a light confirmation status. The tunnel detection system may also include a server communicatively coupled to the ECU and including location data including tunnel locations. The tunnel detection application may be configured to compare the tunnel data with the tunnel locations from the server.

A vehicle may be equipped with the tunnel detection system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
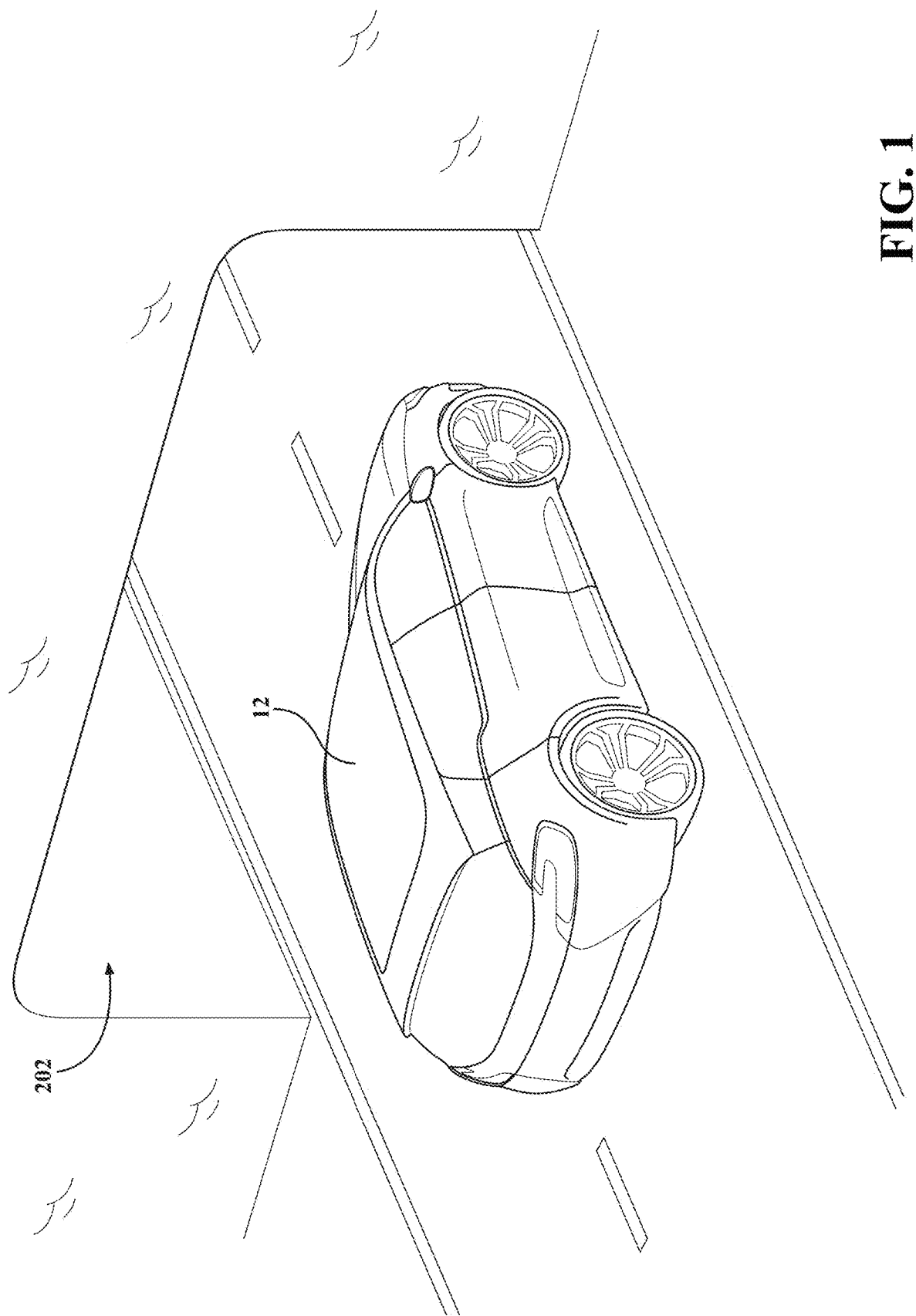
FIG. 1 is a perspective view of a vehicle equipped with a tunnel detection system according to the present disclosure, the vehicle entering a tunnel.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 2:
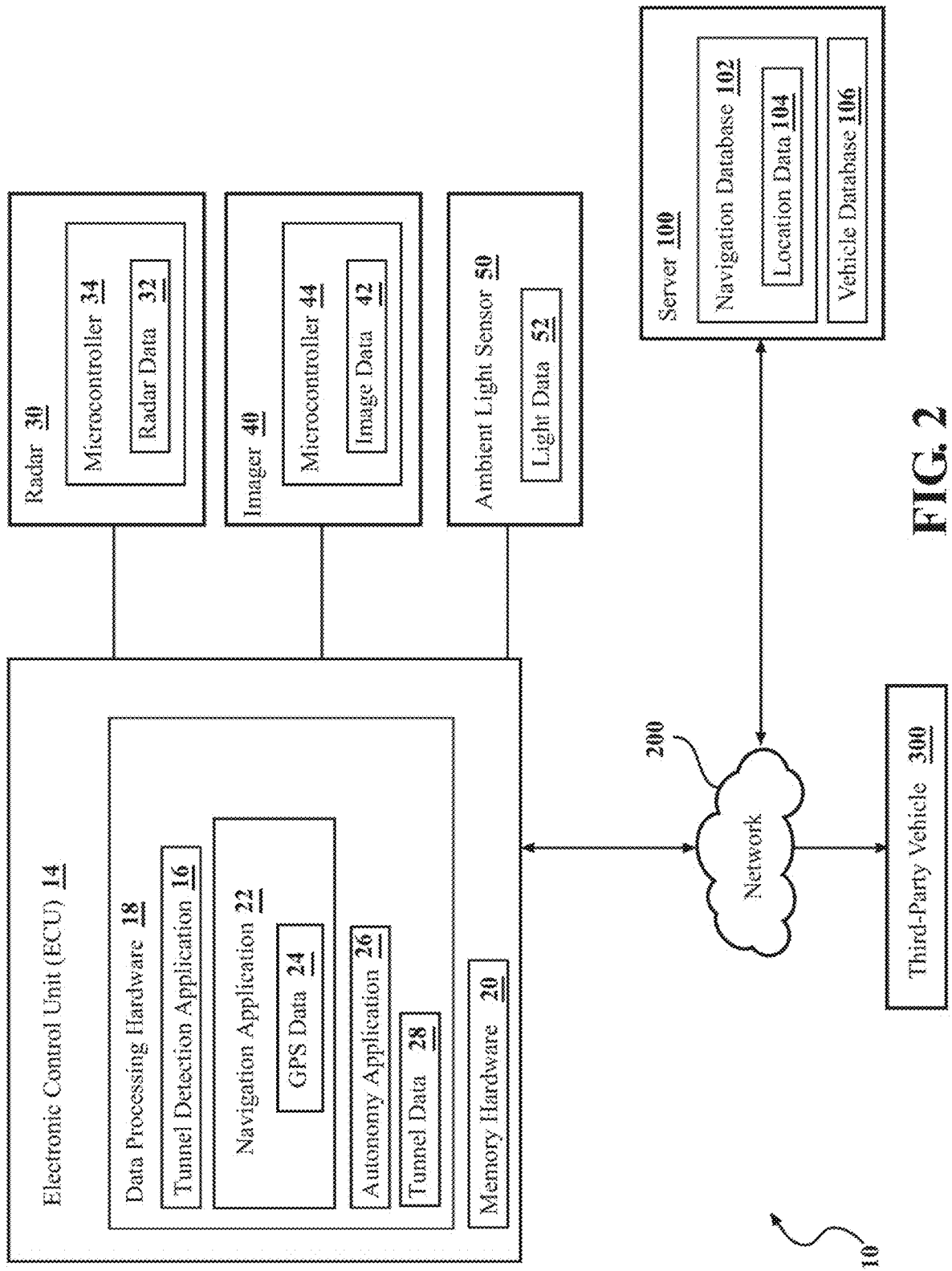
FIG. 2 is a schematic of a block diagram of a tunnel detection system according to the present disclosure.
Figure 3:
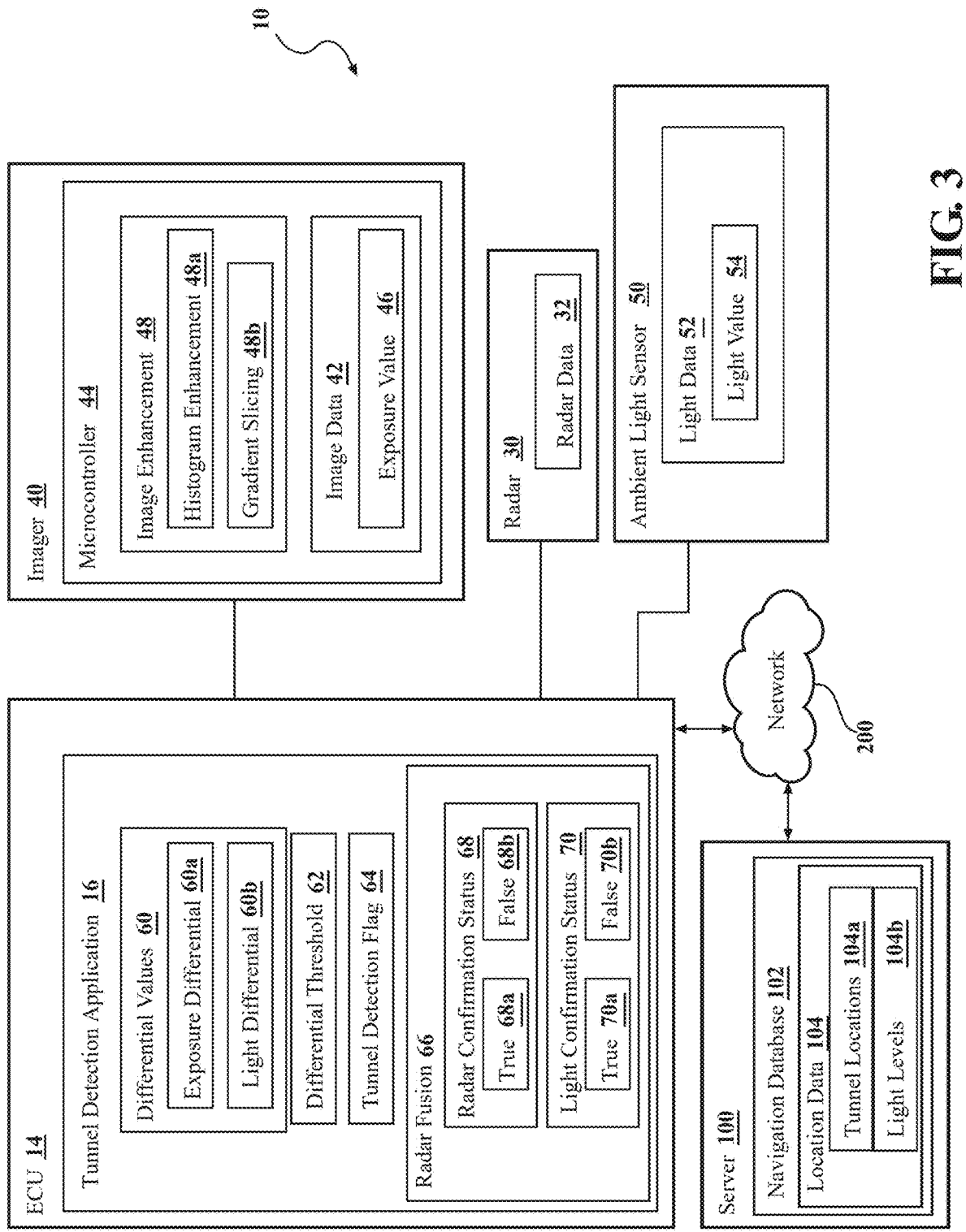
FIG. 3 is another schematic of a block diagram of a tunnel detection system according to the present disclosure.

Referring to FIGS. 1-3, a tunnel detection system 10 for a vehicle 12 includes an electronic control unit (ECU) 14 configured with a tunnel detection application 16 and a server 100 communicatively coupled with the ECU 14 via a network 200. The tunnel detection system 10 also facilitates communication between the server 100 and a third-party vehicle(s) 300 via the network 200, as described in more detail below. The tunnel detection system 10 is configured to improve detection of tunnels 202 as the vehicle 12 enters and travels through a tunnel 202. For example, FIG. 1 illustrates a vehicle 12 entering a tunnel 202. As described herein, the tunnel detection system 10 utilizes real-time verification to identify the tunnel 202, which is advantageous for navigating the vehicle 12 through the tunnel 202. It is generally contemplated that the vehicle 12 may be an autonomous or semi-autonomous vehicle 12, such that identifying tunnels 202 may be advantageous to apply braking points for the vehicle 12.

As described herein, the tunnel detection application 16 is configured as part of data processing hardware 18 of the ECU 14. The tunnel detection application 16 is described with respect to execution on the ECU 14. However, it is contemplated that any central computing module of the vehicle 12 may execute the tunnel detection application 16, and the ECU 14 is provided as an example computing module of the vehicle 12. The ECU 14 also includes memory hardware 20 that is communicatively coupled with the data processing hardware 18. The memory hardware 20 stores instructions that, when executed on the data processing hardware 18, cause the data processing hardware 18 to perform operations, described herein. The data processing hardware 18 also includes a navigation application 22 that includes Global Positioning System (GPS) data 24 of the vehicle 12 and an autonomy application 26. The tunnel detection application 16 is configured to assist in executing the autonomy application 26 by analyzing tunnel data 28, as described in more detail below.

The tunnel detection system 10 also includes radar 30 configured to detect radar data 32, an imager 40 configured to detect image data 42, and at least one ambient light sensor 50 configured to detect light data 52. The radar data 32, the image data 42, and the light data 52 may be collectively referred to as the tunnel data 28, as each are utilized as part of the tunnel detection application 16 in determining the presence of a tunnel 202. Each of the radar 30 and the imager 40 may be equipped with a respective microcontroller 34, 44 configured to respectively process the radar data 32 and the image data 42. Additionally or alternatively, the image data 42 and the radar data 32 may be processed by the ECU 14 using the data processing hardware 18 and the tunnel detection application 16. The tunnel detection system 10 utilizes each of the radar 30, the imager 40, and the ambient light sensor 50 simultaneously, as described below.

With further reference to FIGS. 1-3, the radar 30 emits radar waves that detect objects proximate to the vehicle 12. The radar data 32 gathered by the radar 30 may include noise that may generally obstruct the object, such as the tunnel 202. The microcontroller 34 of the radar 30 may be utilized to filter the radar data 32 in order to minimize the noise that may obstruct useful data of the radar data 32. It is also contemplated in that in other examples, the filtering of the radar data 32 may be executed by the data processing hardware 18 of the ECU 14. The filtered radar data 32 is communicated to the ECU 14 for use with the tunnel detection application 16.

The imager 40 may include a plurality of imagers 40 disposed along the vehicle 12. The imager 40 captures the image data 42 as the vehicle 12 is operational. For example, the image data 42 includes frame-by-frame images captured by the imager 40. The microcontroller 44 of the imager 40 may analyze the image data 42 to determine an exposure value 46 between each captured frame. However, the analysis may similarly be executed by the ECU 14. In some examples, the microcontroller 44 executes an image enhancement 48 of the image data 42. For example, the microcontroller 44 executes a histogram enhancement 48a of the image data 42. The histogram enhancement 48a identifies light and dark areas of the image data and emphasizes each.

For example, the microcontroller 44, using the histogram enhancement 48a, may increase the darkness of the detected dark regions of the image data 42 and increase the lightness of the detected light regions of the image data 42. In this effect, the histogram enhancement 48a may be similar to a contrast enhancement of the image data 42. The microcontroller 44 also executes gradient slicing 48b of the image data 42 as part of the image enhancement 48. Gradient slicing 48b is a process that assists in grouping similar shades of grey. Thus, the microcontroller 44 slices the image data 42 based on gradients determined by the gradient slicing 48b. As mentioned above, the image enhancement 48 may be executed by either the microcontroller 44 of the imager 40 or the ECU 14. The execution of the histogram enhancement 48a and the gradient slicing 48b assists in defining the exposure value 46 of the image data 42. The exposure value 46 is utilized by the tunnel detection application 16 during the operations of identifying the tunnel 202.

Referring still to FIGS. 1-3, the ambient light sensor 50 is configured to capture the light data 52. The light data 52 is provided to and analyzed by the ECU 14. The ECU 14 determines a light value 54 associated with the light data 52 and uses the light value 54 to perform a differential as part of the tunnel 202 identification process of the tunnel detection application 16. The tunnel detection application 16 determines differential values 60 that include an exposure differential 60a and a light differential 60b, which are based on the exposure value 46 and the light value 54, respectfully. In some examples, the microcontroller 44 of the imager 40 may determine the exposure differential 60a and communicate the exposure differential 60a to the tunnel detection application 16. The exposure differential 60a may be determined as a result of the execution of at least one of the histogram enhancement 48a and the gradient slicing 48b. Thus, a tunnel detection flag 64 may be set in response to the execution of the histogram enhancement 48a and/or the gradient slicing 48b of the image data 42. Further, the differential values 60 are compared with a differential threshold 62 to determine whether to set the tunnel detection flag 64 as true.

The tunnel detection application 16 calibrates, at the ECU 14, the differential threshold 62 based on a predetermined period of time and utilizes the average light value 54 for the same predetermined period of time to obtain the mean ambient light condition, or light differential 60b, for the environment. The light differential 60b is then subtracted from the differential threshold 62 to determine the presence of the tunnel 202. Thus, the differential threshold 62 works as a function of the differential values 60. A similar process may be utilized with the exposure differential 60a and the differential threshold 62 to further verify the presence of the tunnel 202. It is contemplated that the calculations using each of the differential values 60 may be executed simultaneously.

With further reference to FIGS. 1-3, the tunnel detection flag 64 may be set based on the differential evaluation of each of the differential values 60. For example, the tunnel detection flag 64 may be set as true or false, where true represents the determination of the presence of the tunnel 202 based on the comparison of the differential values 60 with the differential threshold 62. Further, the tunnel detection application 16 may utilize radar fusion 66 to compare the tunnel detection flag 64 with the radar data 32. In one example, the tunnel detection application 16 may compare the radar data 32 with the light data 52 and to identify the tunnel 202 by comparing a radar confirmation status 68 with a light confirmation status 70.

The radar confirmation status 68 may be set to true 68a or false 68b, and the light confirmation status 70 may also be set to true 70a or false 70b. The tunnel detection application 16 compares the radar confirmation status 68 with the light confirmation status 70 to determine whether the radar confirmation status 68 is a false positive, false negative, true positive, or true negative. A false positive would correspond to the radar 30 determining that a tunnel 202 is present where there is no tunnel 202. Comparatively, a true positive would correspond to the radar 30 detecting that a tunnel 202 is present where there is a tunnel 202. Thus, the comparison of the radar and light confirmation statuses 68, 70 assists the tunnel detection application 16 in identifying a tunnel 202.

A false positive occurs when the radar confirmation status 68 is set to true 68a and the light confirmation status 70 is set to false 70b. The light confirmation status 70 is generally determined based on the light differential 60b comparison with the differential threshold 62. Thus, the light confirmation status 70 is generally relied upon by the tunnel detection application 16 as the barometer for tunnel identification. A false negative occurs when the radar confirmation status 68 is false 68b and the light confirmation status 70 is true 70a. Comparatively, a true negative occurs when the radar confirmation status 68 is set to false 68b and the light confirmation status 70 is also set to false 70b. Similarly, a true positive occurs when both the radar confirmation status 68 and the light confirmation status 70 are set to true 68a, 70a.

When a true positive is determined by the tunnel detection application 16, a tunnel 202 is identified. In contrast, the tunnel detection application 16 determines that there is no tunnel 202 when a true negative is determined. The radar confirmation status 68 and the light confirmation status 70 may be fused to define the radar fusion 66. For example, the tunnel detection application 16 may be configured to execute the radar fusion 66 with the light data 52 and the radar data 32 using the radar confirmation status 68 and the light confirmation status 70. The radar fusion 66 generally represents that the tunnel detection application 16, at least preliminarily, identified a tunnel 202. The tunnel detection application 16 may compare the radar fusion 66 with the image data 42 to further identify the tunnel 202. If the image data 42 confirms the presence of the tunnel 202, then the image data 42 may be fused with the radar fusion 66 to define the tunnel data 28. Thus, the tunnel data 28 is ultimately utilized by the tunnel detection application 16 to identify the tunnel 202.

Referring still to FIGS. 1-3, the tunnel detection system 10 also includes the server 100, which is equipped with a navigation database 102. The navigation database 102 may store location data 104, including tunnel locations 104a and light levels 104b. The ECU 14 is also equipped with the navigation application 22, mentioned above, which provides GPS data 24 to the server 100. The server 100 may communicate the tunnel locations 104a with the data processing hardware 18 via the network 200 based on the GPS data 24. For example, the server 100 may identify the location of the vehicle 12 using the GPS data 24 received from the ECU 14 and may provide corresponding tunnel locations 104a to the ECU 14.

The light levels 104b may be utilized by the tunnel detection system 10 to confirm the light stability relative to the light data 52 received from the ambient light sensor 50. For example, the tunnel detection application 16 may verify the light stability of the surroundings by comparing the light levels 104b provided by the server with the light data 52 detected. Thus, the ECU 14 may confirm the identified tunnel 202 based on the tunnel data 28 with the tunnel locations 104a and light levels 104b provided by the server 100. Further, the ECU 14 may utilize the GPS data 24 in comparison with the tunnel locations 104a received from the server 100 to verify that the vehicle 12 is in the tunnel 202.

In some examples, the ECU 14 may communicate the tunnel data 28 with the server 100 indicating an identified tunnel 202. The server 100 may then record the identified tunnel 202 in the navigation database 102 for future use. Thus, while the server 100 may provide tunnel locations 104a to the ECU 14, the server 100 may advantageously receive the tunnel data 28 to continuously update the navigation database 102. The updated navigation database 102 may be utilized to assist other vehicles that may pass through a location associated with the identified tunnel 202. Further, the server 100 is equipped with a vehicle database 106, which may also be updated with the tunnel data 28. The vehicle database 106 includes known vehicles that utilize the server 100 for data harvesting and communication.

For example, the server 100 may update the tunnel locations 104a and the vehicle database 106 with the updated tunnel locations 104a based on the tunnel data 28. The server 100 may then share the updated tunnel locations 104a with one or more third-party vehicles 300. The third-party vehicle 300 is configured to receive the location data 104 from the server 100 via the network 200. In some examples, the vehicle 12 may utilize the ECU 14 to communicate the tunnel data 28 with the third-party vehicle 300 directly via the network 200.

Figure 4:
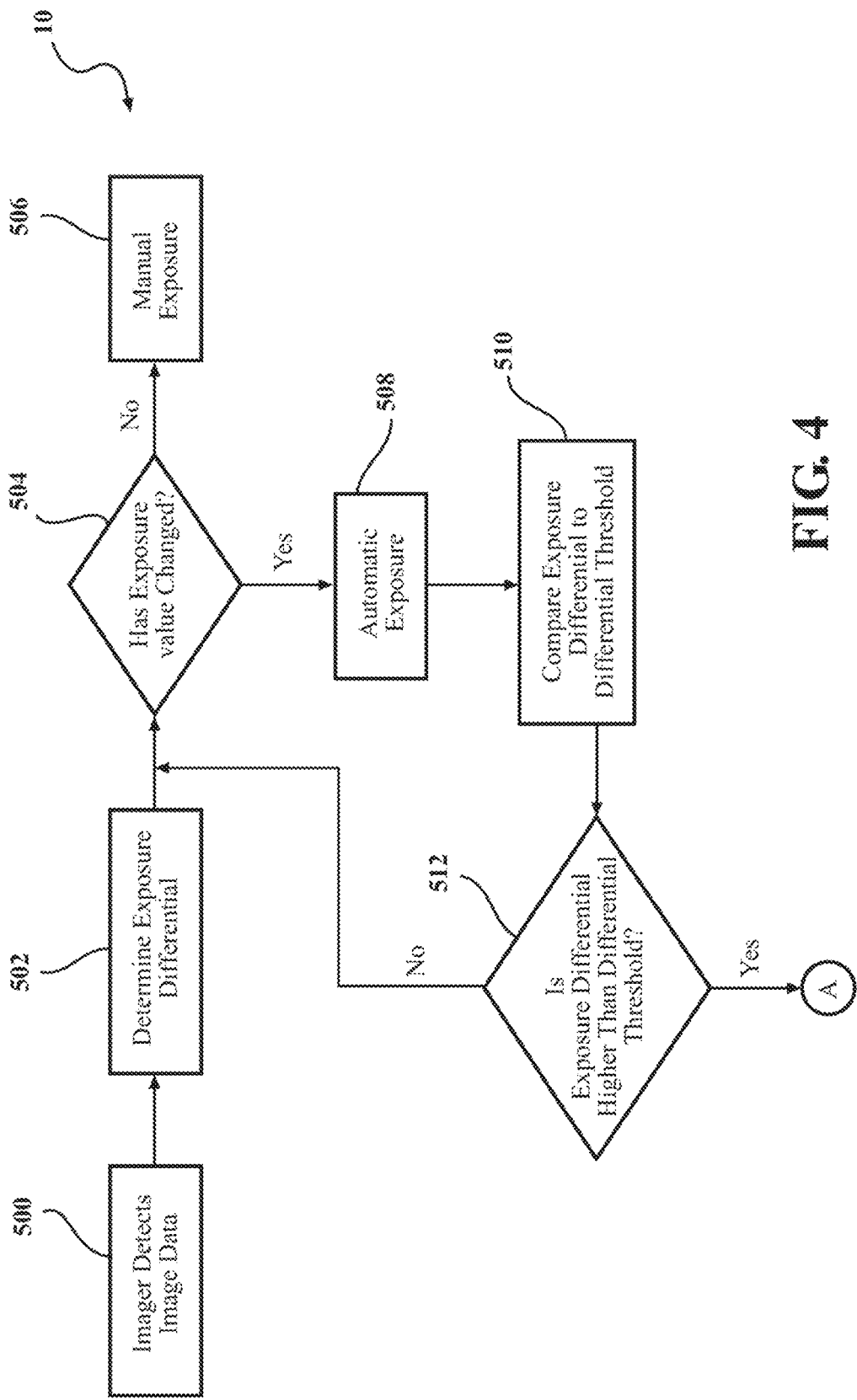
FIG. 4 is an example flow diagram for a tunnel detection system according to the present disclosure.
Figure 5:
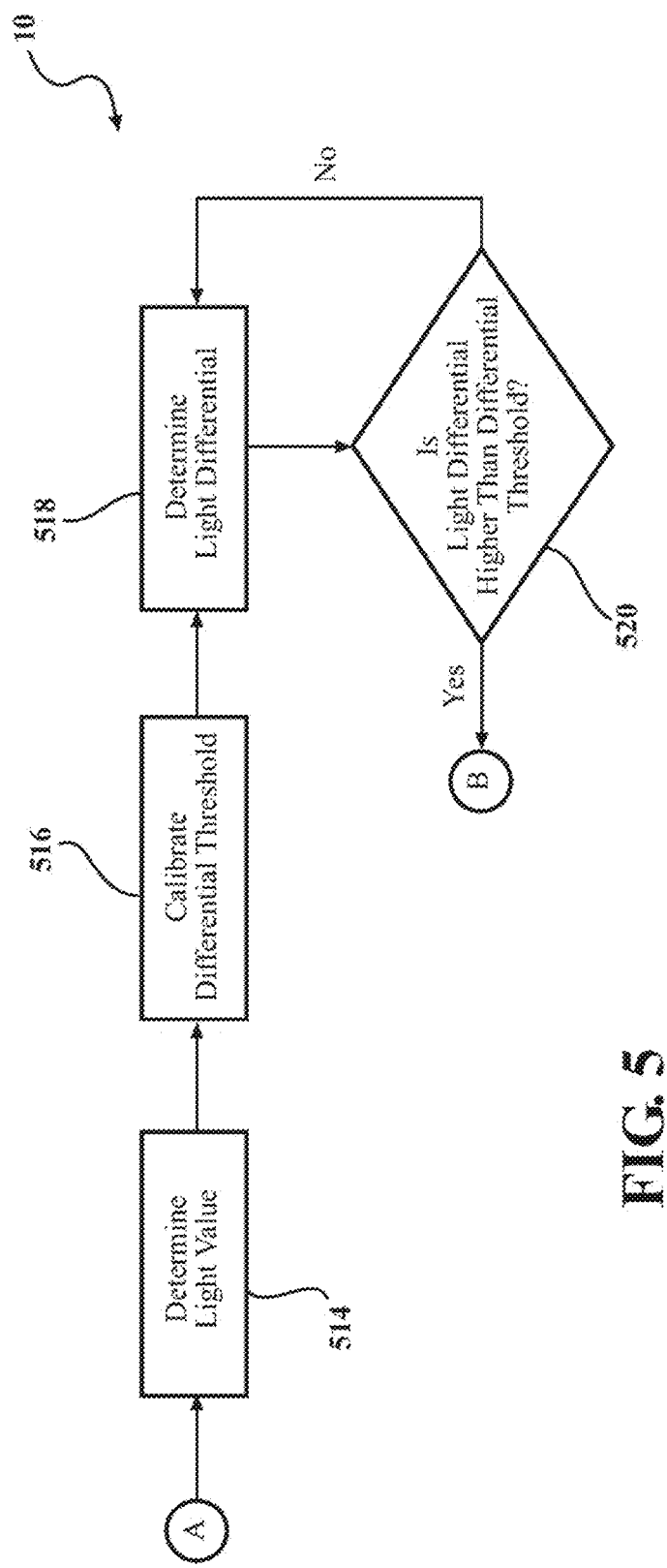
FIG. 5 is another example flow diagram for the tunnel detection system of FIG. 4.
Figure 6:
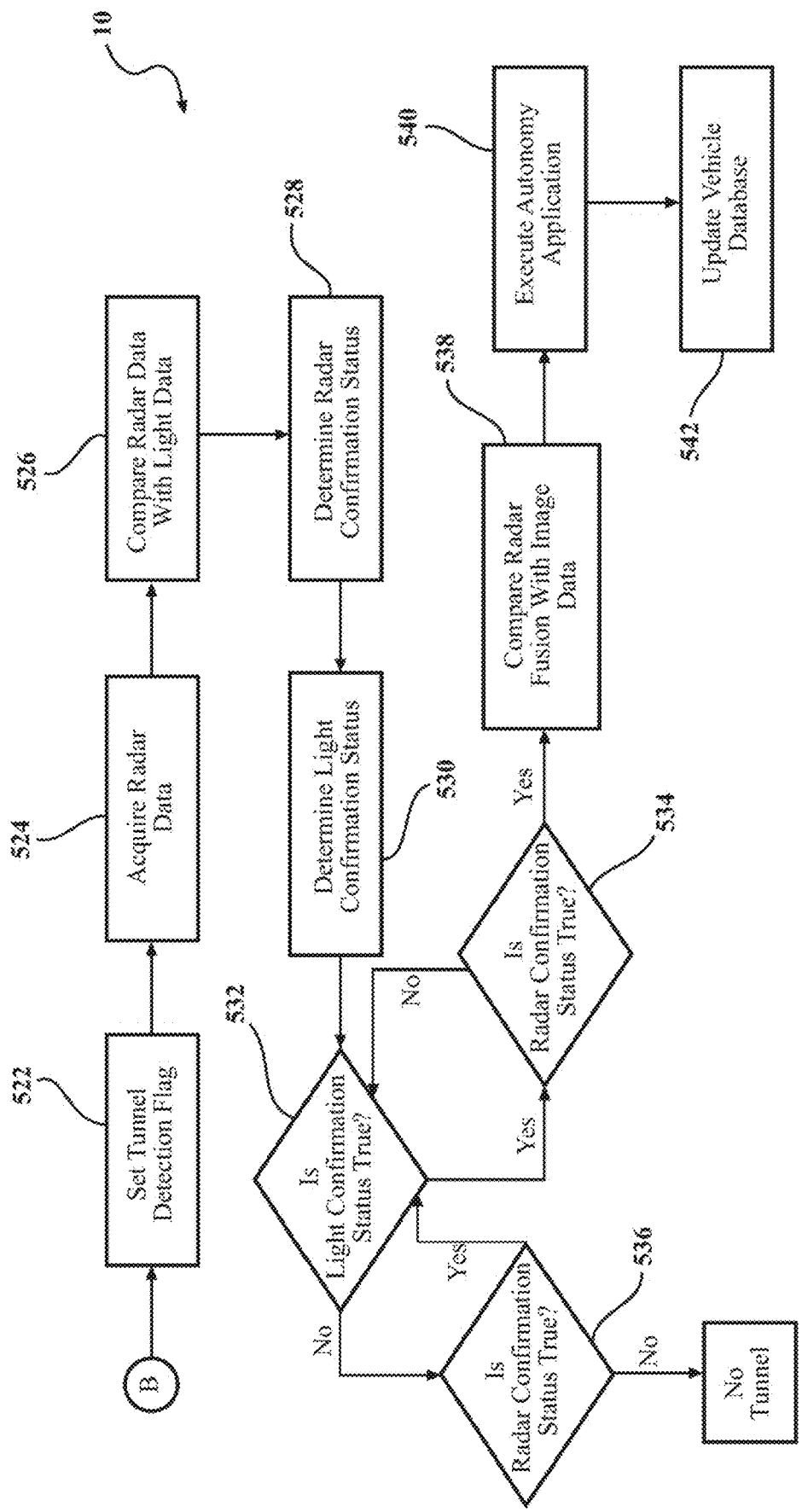
FIG. 6 is a further example flow diagram for the tunnel detection system of FIG. 5.

Referring now to FIGS. 4-6, example flow diagrams for the tunnel detection system 10 are illustrated. At an initial step 500, the imager 40 detects the image data 42, and at 502, the exposure differential 60a is determined. The tunnel detection application 16 determines, at 504, whether the exposure value 46 has changed. If the exposure value 46 has not changed, then the tunnel detection application 16 determines, at 506, that there was a manual exposure. If the exposure value 46 does change, then the tunnel detection application 16 determines, at 508, that there was an automatic exposure. The tunnel detection application 16 then, at 510, compares the exposure differential 60a to the differential threshold 62. Next, the tunnel detection application 16 determines, at 512, whether the exposure differential 60a is higher than the differential threshold 62. If not, then the tunnel detection application 16 returns to evaluating the exposure differential 60a.

If the exposure differential 60a is higher than the differential threshold 62, then the tunnel detection application 16 proceeds. Simultaneously, the tunnel detection application 16 determines, at 514, the light value 54 based on the light data 52. The differential threshold 62 is calibrated, at 516. However, the differential threshold 62 may also be calibrated before the comparison with the exposure differential 60a. The tunnel detection application 16 determines, at 518, the light differential 60b and then determines, at 520, whether the light differential 60b is higher than the differential threshold 62. If not, then the tunnel detection application 16 returns to evaluate the light differential 60b.

If the light differential 60b is higher than the differential threshold 62, then the tunnel detection flag 64 is set, at 522. Simultaneously, the radar data 32 is acquired, at 524. Although described and illustrated in a linear flow diagram, it is contemplated that the steps described herein may occur simultaneously or in non-sequential order to the extent that the tunnel data 28 is determined by the comparison of each of the radar data 32, the image data 42, and the light data 52, as described herein. The tunnel detection application 16 compares, at 526, the radar data 32 with the light data 52 and determines, at 528, the radar confirmation status 68. The tunnel detection application 16 determines, at 530, the light confirmation status 70. The tunnel detection application 16 then determines, at 532, whether the light confirmation status 70 is true 70a. If the light confirmation status 70 is true 70a, then the tunnel detection application 16 determines whether the radar confirmation status 68 is true 68a. If the radar confirmation status 68 is not true 68a, then there is a false negative detection, and the tunnel detection application 16 may return to evaluate the light confirmation status 70.

If the light confirmation status 70, at 532, is not true 68a, then the tunnel detection application 16, at 536, determines whether the radar confirmation status 68 is true 68a. If both the light confirmation status 70 and the radar confirmation status 68 are false 70b, 68b then the tunnel detection application 16 determines, at 538, there is no tunnel 202 detected. If both the light confirmation status 70 and the radar confirmation status 68 are true 70a, 68a, then the tunnel detection application 16 fuses the light data 52 and the radar data 32 and compares, at 538, the radar fusion 66 with the image data 42. The autonomy application 26 is subsequently executed, at 540, and the vehicle database 106 of the server 100 is updated, at 542.

Figure 7:
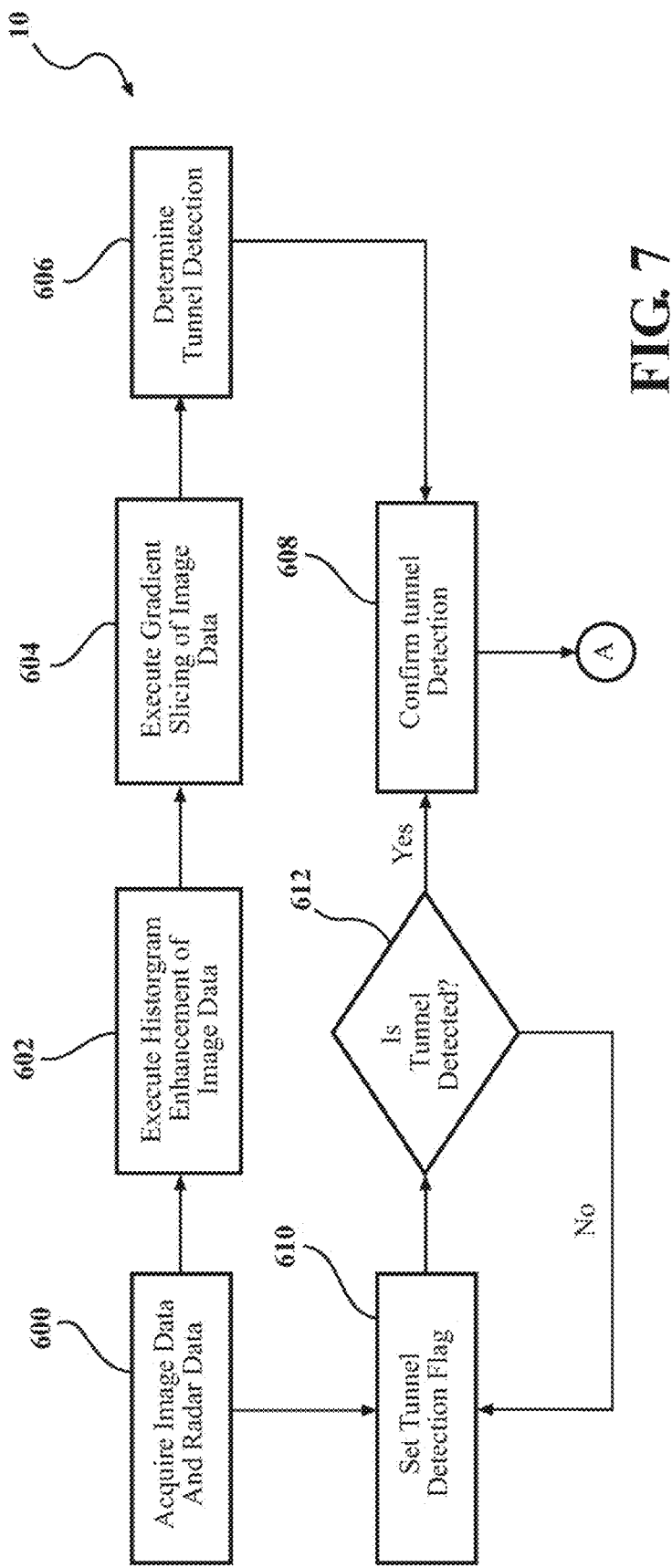
FIG. 7 is another example flow diagram for a tunnel detection system according to the present disclosure.
Figure 8:
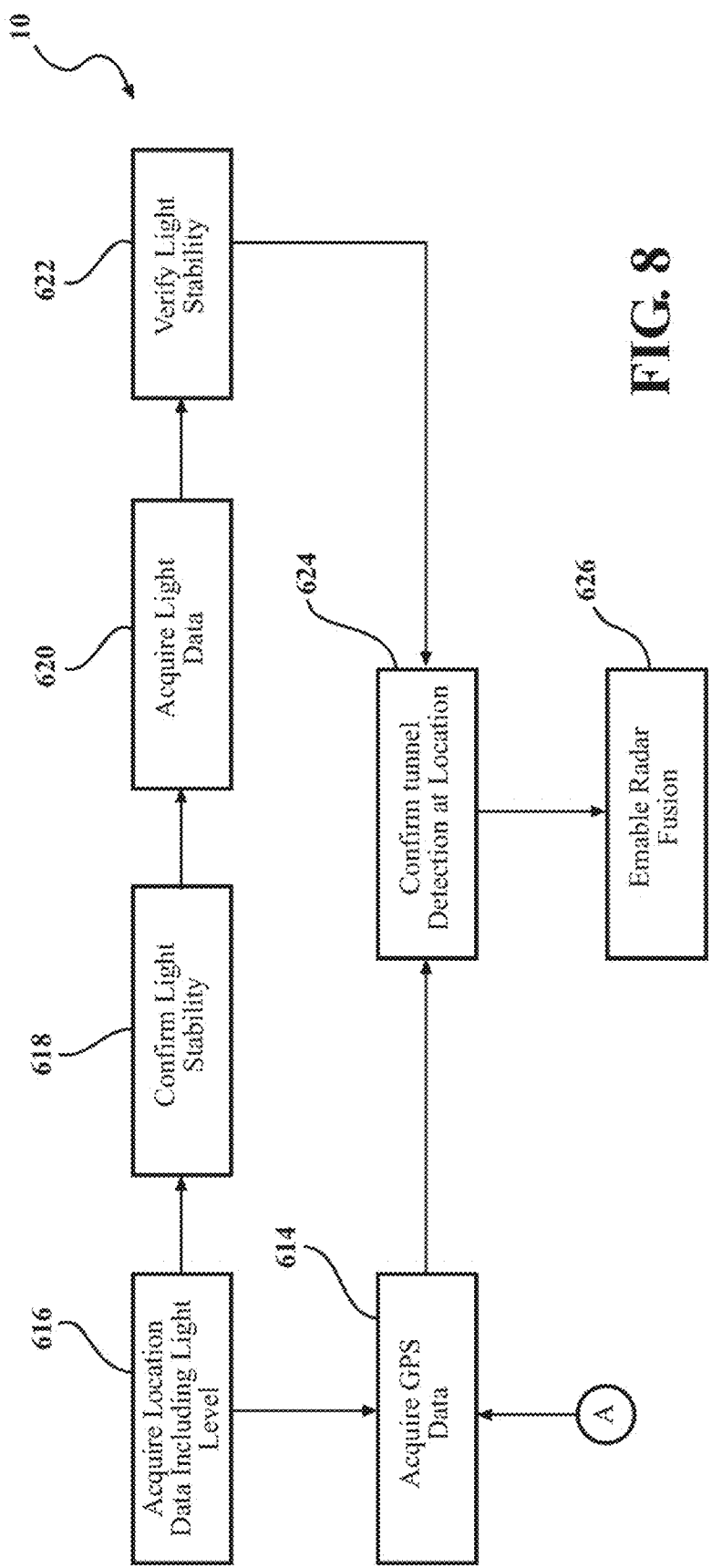
FIG. 8 is a continued example flow diagram of the tunnel detection system of FIG. 7.

Referring now to FIGS. 7 and 8, another example flow diagram for the tunnel detection system 10 is illustrated. At an initial step 600, the tunnel detection system 10 acquires the image data 42 and the radar data 32. The tunnel detection system 10, at 602, executes the histogram enhancement 48a of the image data 42 and, at 604, executes the gradient slicing 48b of the image data 42. The tunnel detection application 16 then determines, at 606, detection of the tunnel 202 and confirms detection of the tunnel 202, at 608. Simultaneously with acquiring the image data 42 and the radar data 32, the tunnel detection system 10 sets, at 610, the tunnel detection flag 64. The tunnel detection application 16 determines, at 612, whether a tunnel 202 is detected. If not, then the tunnel detection application 16 resets the tunnel detection flag 64 to false. If the tunnel 202 is detected, then the tunnel detection application 16 confirms, at 608, the tunnel 202 detection.

The tunnel detection application 16 acquires, at 614, the GPS data 24. Simultaneously with the above steps, the tunnel detection application 16 acquires, at 616, the location data 104 including the light level 104*b* and confirms, at 618, the light stability. The light data 52 is then acquired, at 620, and the light stability is verified, at 622, by the tunnel detection application 16. The tunnel detection application 16 confirms, at 624, detection of the tunnel 202 at the corresponding location and enables, at 626 the radar fusion 66.

Once a tunnel 202 has been identified by the tunnel detection system 10, the vehicle 12 may execute various actions depending on the configuration of the vehicle 12. For example, the vehicle 12 may be an autonomous or semi-autonomous vehicle equipped with adaptive cruise control and/or a super cruise function. The identification of the tunnel 202 assists in maneuvering the vehicle 12 through the tunnel 202. For example, the tunnel detection application 16 may communicate the tunnel data 28 with the autonomy application 26 to improve the longitudinal controls and braking of the vehicle 12 within the tunnel 202. Thus, the braking of the vehicle 12 is advantageously improved as a result of the tunnel detection system 10 when the vehicle 12 is traveling through tunnels 202.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method when executed by data processing hardware of a vehicle causes the data processing hardware to perform operations comprising:
   receiving radar data from a radar;
   receiving image data from an imager;
   receiving light data from an ambient light sensor;
   determining an exposure differential of the image data and a light differential of the light data;
   determining a preliminary tunnel detection indication based on the radar data, the exposure differential, and the light differential;
   receiving, from a navigation database of a server, one or more tunnel locations corresponding to a current location of the vehicle;
   based on the one or more tunnel locations, confirming the preliminary tunnel detection indication to identify a tunnel; and
   sending, to the server, an update indicating the identified tunnel for use by one or more third-party vehicles.

2. The method of claim 1, wherein the operations further comprise controlling, via an autonomy application, a braking system of the vehicle in response to identifying the tunnel.

3. The method of claim 1, wherein the operations further comprise updating, on the server, a vehicle database with the identified tunnel.

4. The method of claim 1, wherein determining the exposure differential of the image data is based on an image enhancement of the image data, the image enhancement comprising at least one of a histogram enhancement and gradient slicing of the image data.

5. The method of claim 1, wherein determining the preliminary tunnel detection indication comprises comparing the exposure differential and the light differential to a calibrated differential threshold.

6. The method of claim 1, wherein determining the exposure differential is based on an image enhancement of the image data, the image enhancement comprising each of a histogram enhancement and a gradient slicing.

7. The method of claim 1, wherein determining the preliminary tunnel detection indication comprises determining a radar confirmation status based on the radar data and a light confirmation status based on the light differential, and comparing the radar confirmation status with the light confirmation status.

8. A tunnel detection system comprising:
   data processing hardware of a vehicle; and
   memory hardware in communication with the data processing hardware, the memory hardware storing instructions that when executed on the data processing hardware cause the data processing hardware to perform operations comprising:
   receiving radar data from a radar;
   receiving image data from an imager;
   receiving light data from an ambient light sensor;
   determining an exposure differential of the image data and a light differential of the light data;
   determining a preliminary tunnel detection indication based on the radar data, the exposure differential, and the light differential;
   receiving, from a navigation database of a server one or more tunnel locations corresponding to a current location of the vehicle;
   based on the one or more tunnel locations, confirming the preliminary tunnel detection indication to identify a tunnel; and
   sending, to the server, an update indicating the identified tunnel for use by one or more third-party vehicles.

9. The tunnel detection system of claim 8, wherein the operations further comprise controlling, via an autonomy application, a braking system of the vehicle in response to identifying the tunnel.

10. The tunnel detection system of claim 8, wherein the operations further comprise updating, on the server, a vehicle database with the identified tunnel.

11. The tunnel detection system of claim 8, wherein determining the exposure differential of the image data is based on an image enhancement of the image data, the image enhancement comprising at least one of a histogram enhancement and gradient slicing of the image data.

12. The tunnel detection system of claim 8, wherein determining the preliminary tunnel detection indication comprises comparing the exposure differential and the light differential to a calibrated differential threshold.

13. The tunnel detection system of claim 8, wherein determining the exposure differential is based on an image enhancement of the image data, the image enhancement comprising each of a histogram enhancement and a gradient slicing.

14. The tunnel detection system of claim 8, wherein determining the preliminary tunnel detection indication comprises determining a radar confirmation status based on the radar data and a light confirmation status based on the light differential, and comparing the radar confirmation status with the light confirmation status.

15. A tunnel detection system of a vehicle comprising:
an imager configured to capture image data and including a microcontroller;
radar configured to capture radar data;
an ambient light sensor configured to capture light data;
an electronic control unit (ECU) communicatively coupled with each of the imager, the radar, and the ambient light sensor and including data processing hardware, the data processing hardware including a tunnel detection application and a navigation application, the tunnel detection application being configured to:
determine an exposure differential of the image data and a light differential of the light data;
determine a preliminary tunnel detection indication based on the radar data, the exposure differential, and the light differential;
receive, from a navigation database of a server, one or more tunnel locations corresponding to a current location of the vehicle;
based on the one or more tunnel locations, confirm the preliminary tunnel detection indication to identify a tunnel; and
send, to the server, an update indicating the identified tunnel for use by one or more third-party vehicles.

16. The tunnel detection system of claim 15, wherein the microcontroller of the imager is configured to execute at least one of a histogram enhancement and gradient slicing of the image data to determine the exposure differential.

17. The tunnel detection system of claim 15, wherein the microcontroller of the imager is configured to execute each of a histogram enhancement and gradient slicing of the image data to determine the exposure differential.

18. The tunnel detection system of claim 15, wherein determining the preliminary tunnel detection indication comprises determining a radar confirmation status based on the radar data and a light confirmation status based on the light differential, and comparing the radar confirmation status with the light confirmation status.

19. The tunnel detection system of claim 15, wherein determining the preliminary tunnel detection indication comprises comparing the exposure differential and the light differential to a calibrated differential threshold.

20. The tunnel detection system of claim 15, wherein the tunnel detection application is further configured to control, via an autonomy application, a braking system of the vehicle in response to identifying the tunnel.

* * * * *